United States Patent
Wellum et al.

(10) Patent No.: US 7,813,384 B2
(45) Date of Patent: Oct. 12, 2010

(54) METHOD AND SYSTEM FOR REDUCING SYNCHRONIZATION OF DATA IN A NETWORK

(75) Inventors: Richard Wellum, Rohnert Park, CA (US); Alex Zhang, Rohnert Park, CA (US)

(73) Assignee: Cisco Technology, Inc., San Jose, CA (US)

( * ) Notice: Subject to any disclaimer, the term of this patent is extended or adjusted under 35 U.S.C. 154(b) by 977 days.

(21) Appl. No.: 11/429,056

(22) Filed: May 4, 2006

(65) Prior Publication Data

US 2007/0258490 A1    Nov. 8, 2007

(51) Int. Cl.
*H04J 3/06* (2006.01)
(52) U.S. Cl. .................................... 370/503; 709/223
(58) Field of Classification Search ............... 370/441, 370/324, 350, 503–514; 709/248
See application file for complete search history.

(56) References Cited

U.S. PATENT DOCUMENTS

| | | | |
|---|---|---|---|
| 6,047,322 A * | 4/2000 | Vaid et al. | 709/224 |
| 6,490,246 B2 * | 12/2002 | Fukushima et al. | 370/220 |
| 7,315,865 B1 * | 1/2008 | Jernigan, IV | 707/102 |
| 7,464,266 B2 * | 12/2008 | Wheeler | 713/168 |

OTHER PUBLICATIONS

Brian C. Wyld and Jean-Pierre Allegre, 'High Availability in the OpenCall SS7 Platform—Technology Information—Technical', Aug. 1997, p. 2, 3, 4, 'Hewlett-Packard Journal'.
Velibor Markovski, Fei Xue and Ljiljana Trajkovic, 'Simulation and Analysis of Packet Loss in Video Transfers using User Datagram Protocol', May 2005, p. 2, 3,4 ,5, 'Kluwer Academic Publishers', Netherlands.

* cited by examiner

*Primary Examiner*—Nittaya Juntima
*Assistant Examiner*—Mon Cheri S Davenport
(74) *Attorney, Agent, or Firm*—Trellis IP Law Group, PC

(57) ABSTRACT

In one embodiment, a method and a system for reducing synchronization of data in a network is disclosed. The method includes generating a string based on the configuration in a first network device. Thereafter, the generated string is hashed to form a first integer. The first integer is used to identify an object. Subsequently, the identified object is utilized for synchronization between the first network device and a second network device. As a result, the need for synchronization of the data is reduced.

24 Claims, 5 Drawing Sheets

METHOD AND SYSTEM FOR REDUCING SYNCHRONIZATION OF DATA IN A NETWORK

BACKGROUND OF THE INVENTION

1. Field of Invention

Embodiments of the invention relate, in general, to networking and networking solutions. More specifically, embodiments of the invention relate to reducing or eliminating synchronization of data in order to support a stateful switchover function in a network.

2. Description of the Background Art

In typical network devices, data is transferred and synchronized from an active side to a standby side using Stateful Switch Over (SSO). The process of ensuring that identical data is present in active and standby sides is called synchronization. In one synchronization approach, Simple Network Management Protocol (SNMP) provides a protocol that allows exchange of management information among the network devices. SNMP is used in Quality of Service (QoS) data in popular Management Information Bases (MIBs). The MIB helps the customers to access Modular Quality of Service Configuration (QoSMQC) data and statistics. The QoSMQC data and statistics are indexed by object identifiers (OIDs).

The OIDs are generated randomly by a counter on an active side of a network device or devices where SSO is used. Subsequently, during SSO the OIDs generated in the active side must also be transferred to the standby side. However, the synchronization of OIDs can require a large amount of memory, bandwidth, processor cycles, or other resources.

DETAILED DESCRIPTION OF EMBODIMENTS OF THE INVENTION

Various embodiments of the invention provide a method, system, and computer-readable media for reducing synchronization of data in a network. In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Embodiments of the invention describe a method for reducing synchronization of data in a network, such as by reducing the needed transfer of OIDs to achieve Stateful Switch Over (SSO). Such a method is performed in a High System Availability (HSA) mode. The method involves generation of a string based on the configuration of a Modular Quality of Service (QoSMQC). The generated string is hashed to form an integer. The integer is unique and represents an object identifier in the QoSMQC. The object identifier is utilized to index the configuration of the QoSMQC in a Management Information Base (MIB). Further, the configuration of the QoSMQC and Class Based Quality of Service Management Information Base (CBQoSMIB) object identifiers are correlated. Hashing of identical strings leads to generation of identical object identifiers. Consequently, the need for synchronization of the data is reduced.

Figure 1:
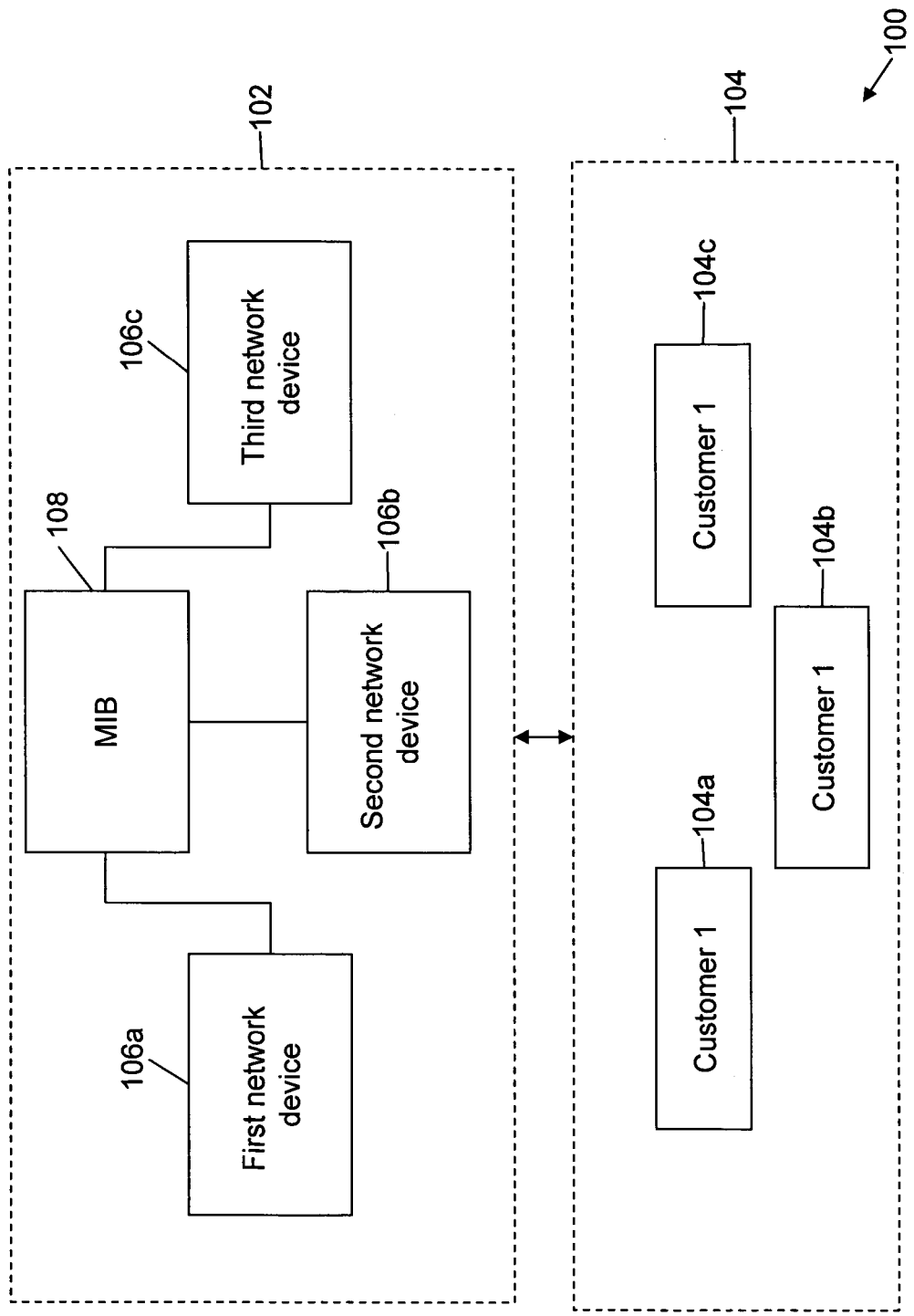
FIG. 1 illustrates an environment, wherein various embodiments of the invention are implemented.

Referring now to the drawings, particularly by their reference numbers, FIG. 1 illustrates environment 100, wherein various embodiments of the invention are implemented. Environment 100 includes network 102 and customers 104. Customers 104 include customers 104a, 104b, and 104c. Network 102 includes a plurality of network devices 106 and MIB 108. Network devices 106 include first network device 106a, second network device 106b, and third network device 106c. Examples of network devices 106 include routers, printers, hubs, access servers, switches, bridges, storage devices, and computer hosts. MIB 108 is a database used for managing network devices 106. Customers 104 interact with network 102. It is to be understood that the specific designation of a network device is for the convenience of readers and is not to be construed as limiting the specific type or number of network devices 106 included in network 102.

Examples of network 102 include but are not limited to Local Area Networks (LANs), Wide Area Networks (WANs), Metropolitan Area Networks (MANs), and Personal Area Networks (PANs), the Internet, and the Ethernet. Network 102 can have various network topologies such as mesh, star, ring, and bus topologies.

Network devices 106 direct the traffic of network 102. Data packets are forwarded within network 102. The data packets include blocks of data that include information for delivering data to a destination. The transfer and forwarding of the data packets occurs at a network layer in an Open Systems Interconnection (OSI) seven-layer model. MIB 108 includes the status information about network devices 106. MIB 108 includes a chain of indexes in the form of reference tables. These reference tables include Quality of Service (QoS) configuration and statistics. A management entity such as Network Management Systems (NMSs) manages network devices 106 by utilizing MIB 108. MIB 108 is utilized by NMSs using Simple Network Management Protocol (SNMP). The SNMP is an application layer protocol that facilitates the exchange of information between network devices 106. Embodiments of SNMP include SNMP version 1 and SNMP version 2. MIB 108 receives status information from network devices 106. The status information also includes the configuration of the QoS.

Figure 2:
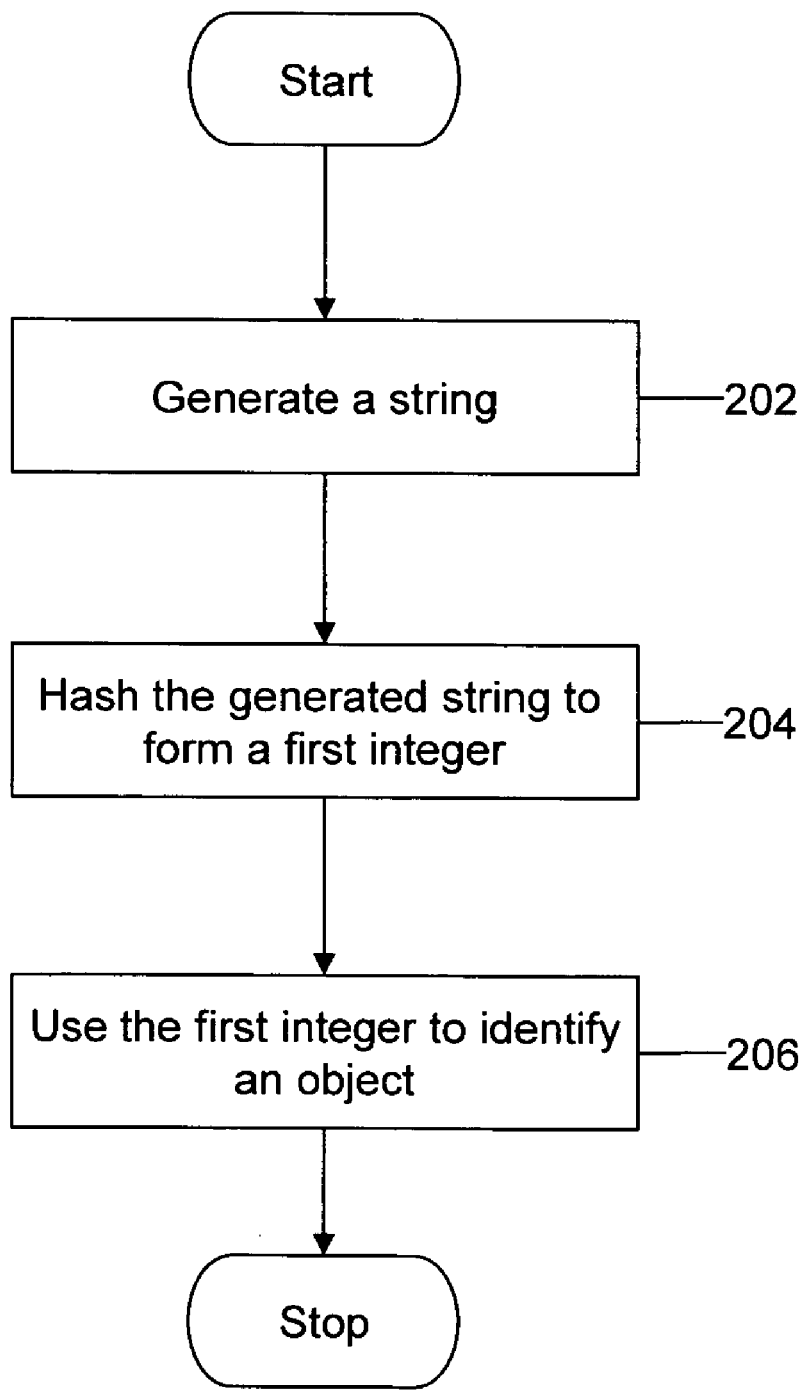
FIG. 2 is a flowchart illustrating the steps involved in reducing synchronization of data in a network, in accordance with an embodiment of the invention.

FIG. 2 is a flowchart illustrating the steps involved in reducing synchronization of data in a network, in accordance with an embodiment of the invention. At step 202, a string is generated. The string is generated based on the configuration in first network device 106a. The configuration in first network device 106a is accessed through a Modular Quality of Service Command-Line Interface (MQC CLI). The generation of the string based on the configuration of first network device 106a can be in accordance with any suitable approach.

It is usually necessary to use enough unique configuration information in order to represent data for synchronization to a desired degree of accuracy. Depending on the application, any appropriate selection of configuration information may be used to efficiently represent any amount or type of data. For example, an index in a MIB, direction of policy applied (input or output), configuration text, previously hashed values, port number, IP address, memory location, device identifier, digital signature, or other information, can be used to generate a string.

At step 204, the generated string is hashed to form a first integer. At step 206, the first integer is used to identify an object. The identified object is then utilized for synchronization between first network device 106a and second network device 106b. The steps 202, 204, and 206 have been explained in greater detail in conjunction with FIG. 3.

In accordance with an embodiment of the invention, the identified object utilized for synchronization between first network device 106a and second network device 106b includes a database entry. The identified object helps to link the data in the database entry for quick scanning.

In accordance with another embodiment of the invention, the identified object utilized for synchronization between first network device 106a and second network device 106b includes a verification value. The verification value is utilized to perform Cyclic Redundancy Check (CRC) and also to create encryption values for verifying software builds.

In accordance with yet another embodiment of the invention, the identified object is utilized to communicate the data between first network device 106a and second network device 106b. As mentioned in step 204, the first integer is formed after hashing. This first integer is utilized as an index for communicating data. The utilization of the index to communicate the data across network devices 106 maintains index persistency in MIB during reload and reconfiguration.

In accordance with an embodiment of the invention, the identified object includes an object identifier in a Quality of Service (QoS) operation. The QoS refers to the capability of network 102 to provide better services to the selected network traffic over various technologies. Examples of various technologies include Frame Relay, Asynchronous Transfer Mode (ATM), SONET, the Ethernet (such as Regular, Fast, Gigabyte), Serial-Frame relay, etc. The QoS allows configuration of the network traffic in network 102. The QoS can be a Modular Quality of Service (QoSMQC).

Figure 3:
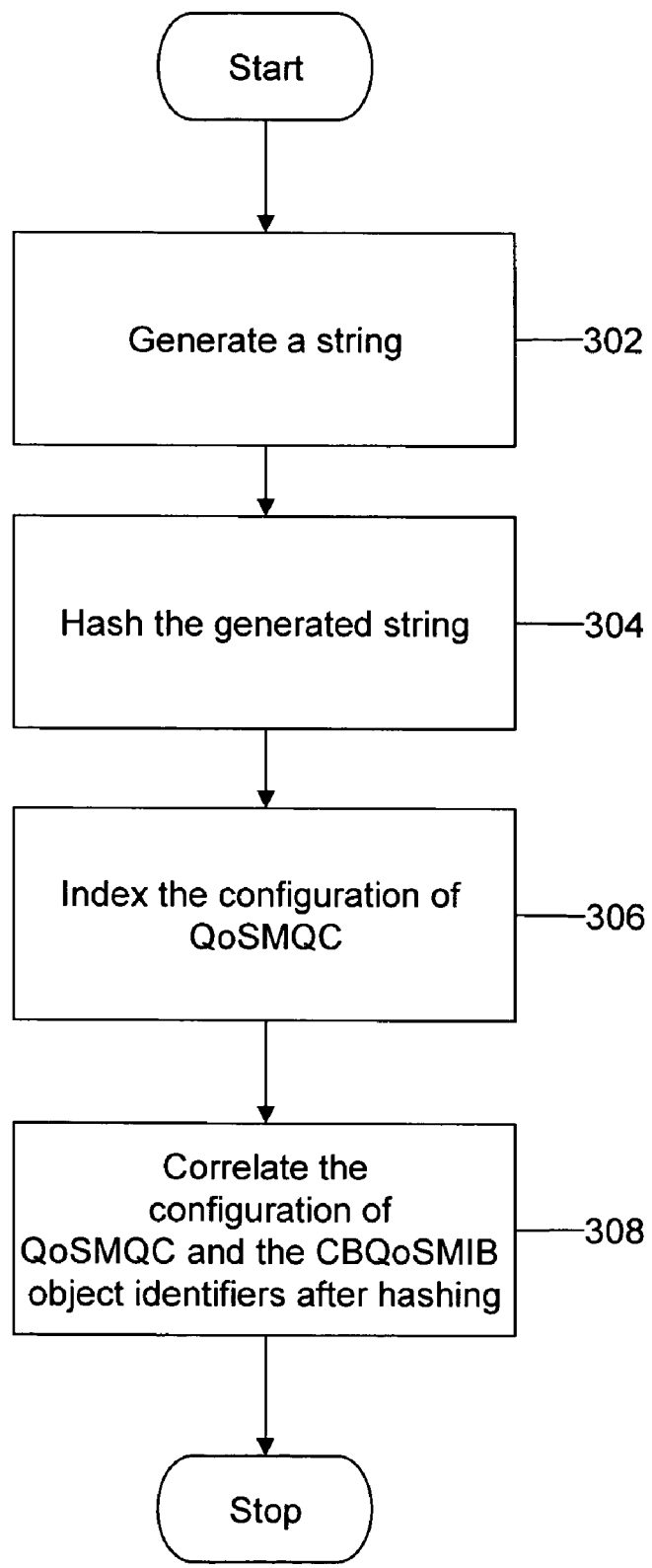
FIG. 3 is a flowchart illustrating the detailed steps involved in reducing synchronization of data in a network, in accordance with an embodiment of the invention.

FIG. 3 is a flowchart illustrating the detailed steps involved in reducing synchronization of data in a network, in accordance with an embodiment of the invention. At step 302, a string is generated, based on the configuration of the QoSMQC. At step 304, the generated string is hashed to form an integer. The integer represents an object identifier. In accordance with an embodiment of the invention, the hashing is performed using an industry-based algorithm, for example, Elf Hash Algorithm. The Elf Hash Algorithm hashes the configuration of the QoS into a 32-bit integer. The Elf Hash Algorithm is capable of handling different strings of varying sizes. The hash size is selected based on the configuration of the QoS. For example, in CBQosObjectsIndex and CBQosConfigIndex, a minimum of 4-digit hash base is selected.

Subsequently, at step 306, the configuration of the QoSMQC is indexed using the object identifiers in a Management Information. The indexing in the Management Information can be performed in the form of tables. The use of the object identifiers and navigation of the Management Information would be apparent to a person ordinarily skilled in the art. The Management Information can be Management Information Base (MIB) 108. MIB 108 is a database for managing network devices 106. MIB 108 is a Class Based Quality of Service Management Information Base (CBQoSMIB). The CBQoSMIB describes the configuration of the QoSMQC in network devices 106. At step 308, the QoSMQC configuration and the CBQoSMIB object identifiers after hashing are correlated. In another embodiment of the invention, the QoSMQC configuration and a Management Information Base object identifiers after hashing are correlated. Further details of the method described with the reference of FIG. 3, has been explained with the help of an example in conjunction with FIG. 6.

Figure 4:
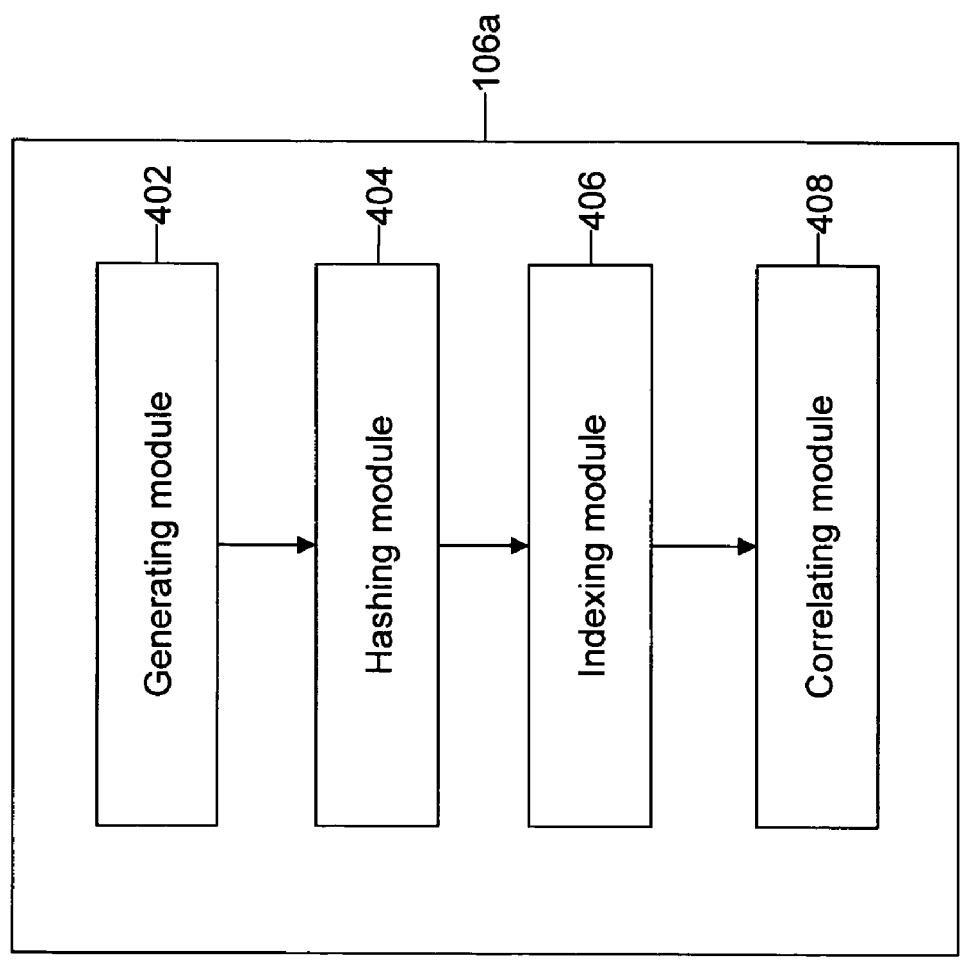
FIG. 4 is a block diagram illustrating various elements of a system for reducing synchronization of data in a network, in accordance with an embodiment of the invention.

FIG. 4 is a block diagram of network device 106a illustrating various elements of a system for reducing synchronization of data in network 102, in accordance with an embodiment of the invention. Each of network devices 106 includes generating module 402, hashing module 404, indexing module 406, and correlating module 408.

Generating module 402 generates a string based on the configuration of the QoSMQC. Hashing module 404 hashes the string generated by generating module 402 to form the first integer. The first integer represents an object identifier in the QoSMQC. Subsequently, indexing module 406 indexes the configuration of the QoSMQC in the CBQoSMIB. Indexing is performed in the reference tables that contain the QoSMQC configuration and statistics. Thereafter, correlating module 408 correlates the QoSMQC configuration and the CBQoSMIB object identifiers after hashing. This facilitates identifying the hashed string and the CBQoSMIB output for indexing in MIB 108.

In accordance with an embodiment of the invention, the method for reducing synchronization of data is performed in High System Availability mode (HSA) and Non-High System Availability mode (NHSA). The HSA mode includes an active side and a standby side. In case of hardware and configuration failure, the standby side takes over the functions of the active side. Therefore, the data is transferred from the active side to the standby side. The transfer of the data is performed using SSO. In case, the active side fails due to hardware or configuration failure, the SSO occurs from the active side to the standby side. As a result, the system does not remain in a failed state for a very long time, thereby increasing the system availability and providing uninterrupted flow. In case of the NHSA, the SSO is not performed from the active side to the standby side. Thereby, leading to low system availability.

In accordance with an embodiment of the invention, the method performed in the HSA mode involves hashing the generated string to form a third integer. The third integer represents an HSA object identifier. The HSA object identifier is derived identically in both the active side and the standby side. As a result, there is no need to synchronize the data. The method for reducing synchronization of the data in the HSA mode has been explained in conjunction with FIG. 5.

In accordance with an embodiment of the invention, the method involves a collision-handling mechanism. During reconfiguration of network devices 106, the configuration is read from Non-Volatile Random Access Memory (NV RAM). When the strings are hashed, collisions occur in network devices 106 in a different order prior to the reconfiguration. Therefore, two different hashed strings lead to the generation of a same integer value. The same integer value subsequently leads to corruption of the data. In the collision-handling mechanism, a global counter file is utilized. The global counter file is saved and is synced between the active side and the standby side. Subsequently, the global counter file is checked for each string collision. As a result, the encumbrance of collisions on the performance of this approach is small compared to the storing of the entire MIB 108 in the NV RAM. Other collision-handling mechanisms can also be used.

In accordance with an embodiment of the invention, the method for reducing synchronization of data in network 102 is utilized to trace the data. This is achieved on the basis of an integer, which is generated by hashing the configuration string. The generated integer is unique in nature and represents an object identifier. This object identifier is utilized to trace the data.

Figure 5:
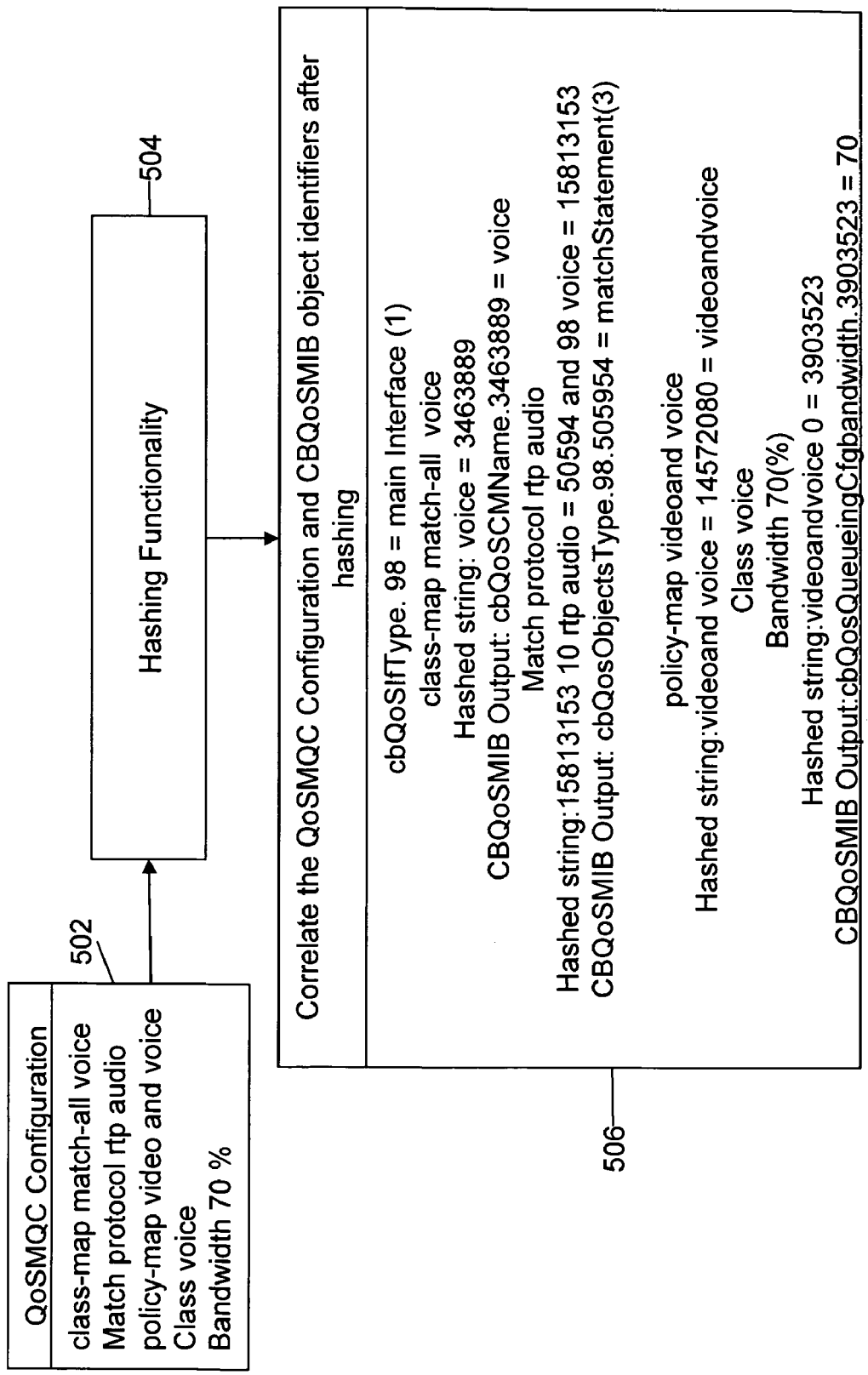
FIG. 5 is a flow diagram illustrating a correlation among QoSMQC and CBQoSMIB object identifiers after hashing, in accordance with an embodiment of the invention.

FIG. 5 is a flow diagram illustrating a correlation among QoSMQC and CBQoSMIB object identifiers after hashing, in accordance with an embodiment of the invention. In accordance with a preferred embodiment of the invention, the string is generated based on the QoSMQC, a class of the configuration, a network interface, and a policy-map. The policy-map is a list of instructions attached to the network interface. At step 502, the class-map match-all voice and policy-map videoandvoice are attached. A bandwidth of 70 percent is also specified. At step 504, strings are generated from the configuration statements of the QoSMQC. Further, the generated strings are hashed to form an integer. The integer represents an object identifier. In addition, the configuration statements are indexed in the CBQoSMIB.

At step 506, the QoSMQC configurations and the CBQoSMIB object identifiers after hashing are correlated. At step 506, the non hashed value represents the interface, for example, cbQosIfType.98=maininterface (1). The class-map match-all voice includes hashed string voice=3463889. The corresponding CBQoSMIB output is cbQosCMName.3463889=voice. Further, the match protocol rtp audio includes hashed string 15813153 10 rtp audio=505954 and 98 voice=15813153. The corresponding CBQoSMIB output for match protocol rtp audio is cbQosobjectsType.98.505954=match statement (3). In addition, the policy-map videoandvoice includes the hashed string videoandvoice=14572080. The corresponding CBQoSMIB output is cbQosPolicyMapName.14572080=videoandvoice. Finally, the class voice bandwidth 70% includes hashed string videoandvoice 0=3903523. The corresponding CBQoSMIB output is cbQosQueueingCfgBandwidth.3903523=70. As mentioned above, corresponding to every hashed string a unique integer is generated for the class-map match-all voice, match protocol rtp audio, policy-map videoandvoice, and class voice bandwidth 70%, for example, 3463889 is the integer corresponding to hashed string voice.

In accordance with an embodiment of the invention, the hashing functionality includes generating strings based on the configuration statements of the QoSMQC. The strings are hashed to form a second integer. The second integer represents a runtime object identifier. The runtime object identifier is the object identifier generated when a program is running.

In accordance with an embodiment of the invention, the method for reducing synchronization of the data can be performed in an Interface Management Information Base (IF-MIB). The IF-MIB is a Management Information Base for various network interfaces. Further, the method for reducing synchronization of the data can be applied to multiple interfaces and multiple devices.

In accordance with an embodiment of the invention, the method for reducing synchronization of the data is performed in network storage systems. The network storage systems utilize a unique index value to share the data among themselves. The utilization of the unique index value helps in maintaining persistency of the data across the network storage systems. Further, this helps in reducing the amount of the data to be communicated across the network storage systems.

According to various embodiments of the invention, a method for reducing synchronization of data in a network is provided. The network comprising network devices, the network devices transferring the data with in the network, the method comprising generating a string based on a configuration in a first network device; hashing the generated string to form a first integer; and using the first integer to identify an object, wherein the identified object is used in a synchronizing operation between the first network device and a second network device.

In another embodiment of the invention, a method for reducing synchronization of data in a network, the network comprising network devices, the network devices transferring the data from an active side to a standby side in a High System Availability mode (HSA), the method comprising generating a string based on configuration of a Modular Quality of Service (QoSMQC); hashing the generated string to form a first integer, the first integer representing an object identifier in the QoSMQC; indexing the configuration of the QoSMQC in a Management Information using the object identifier; and correlating the configuration of the QoSMQC and the CBQoSMIB object identifiers, the CBQoSMIB object identifiers are formed after hashing.

In another embodiment of the invention, a system for reducing synchronization of data in a network, the system comprising a plurality of network devices, the plurality of network devices comprising means for generating a string based on configuration of a Modular Quality of Service (QoSMQC); and means for hashing the generated string to form a first integer, the first integer representing an object identifier in the QoSMQC.

In another embodiment of the invention, a computer program product for reducing synchronization of data in a network, the computer program product comprising a computer readable-medium comprising: one or more instructions for generating a string based on a configuration in a first network device; one or more instructions for hashing the generated string to form a first integer; and one or more instructions for using the first integer to identify an object, wherein the identified object is used in synchronizing operation between the first network device and a second network device.

Various embodiments of the invention provide a method for reducing synchronization of the data from first network device 106*a* to second network device 106*b*. The method does not require packaging the data in the data packets in a tight and efficient manner. The generation of identical object identifiers facilitates transferring of the data without the need of packaging them.

Various embodiments of the invention facilitate a method for retrieving error free data from the standby side. This is achieved by hashing the generated string to form identical object identifiers on both an active side and a standby side.

Various embodiments of the invention reduce loss of CPU memory and CPU cycles. Further, the invention reduces CPU HOGS. Consequently, the memory and CPU cycles that are lost during synchronization are saved.

Various embodiments of the invention can be applied to runtime operations.

Various embodiments of the invention describe a method for reducing synchronization of the data in the network. Such a method is compatible with both High System Availability mode and Non-High System Availability mode.

Various embodiments of the invention can be applied to multiple interfaces, where the customers apply policy maps.

Various embodiments of the invention can be performed in an Interface Management Information Base (IF-MIB). The IF-MIB is a Management Information Base for various network interfaces. Further, the IF-MIB requires synchronizing and sharing data.

Various embodiments of the invention provide a collision handling mechanism. The collision handling mechanism reduces the generation of collisions during hashing.

Various embodiments of the invention can be applied in a data storage industry, where the data can be generated locally instead of sharing and synchronizing the data.

Various embodiments of the invention facilitate tracing the data based on the integer generated by hashing the configuration.

Various embodiments of the invention facilitate quick scanning of the database entry. The quick scanning helps to link the data in the database entry.

Various embodiments of the invention facilitate performing CRC and creating encryption values for verifying software builds.

Various embodiments of the invention facilitate performing Stateful Switch Over (SSO) and In Service Software Upgrade (ISSU).

Various embodiments of the invention facilitate applying the method to lower platforms such as c7507 and c7300.

Various embodiments of the invention can be implemented in platforms where there is a need to synchronize large amount of management data that is built in form of tables.

Although the invention has been discussed with respect to specific embodiments thereof, these embodiments are merely illustrative, and not restrictive, of the invention.

Although specific protocols have been used to describe embodiments, other embodiments can use other transmission protocols or standards. Use of the terms 'peer', 'client', and 'server' can include any type of device, operation, or other process. The present invention can operate between any two processes or entities including users, devices, functional systems, or combinations of hardware and software. Peer-to-peer networks and any other networks or systems where the roles of client and server are switched, change dynamically, or are not even present, are within the scope of the invention.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claim.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

Embodiments of the invention may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of the present invention can be achieved by any means as is known in the art. Distributed or networked systems, components and circuits can be used. Communication, or transfer, of data may be wired, wireless, or by any other means.

A "computer-readable medium" for purposes of embodiments of the present invention may be any medium that can contain and store the program for use by or in connection with the instruction execution system, apparatus, system or device. The computer readable medium can be, by way of example only but not by limitation, a semiconductor system, apparatus, system, device, or computer memory.

Any suitable programming language can be used to implement the routines of the present invention including C, C++, Java, assembly language, etc. Different programming techniques can be employed such as procedural or object oriented. The routines can execute on a single processing device or multiple processors. Although the steps, operations or computations may be presented in a specific order, this order may be changed in different embodiments. In some embodiments, multiple steps shown as sequential in this specification can be performed at the same time. The sequence of operations described herein can be interrupted, suspended, or otherwise controlled by another processes. The routines can operate in an environment or as stand-alone routines occupying all, or a substantial part, of the system processing.

A "processor" or "process" includes any hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

What is claimed is:

1. A method comprising:
    generating a string based on configuration information in a first network device;
    hashing the generated string to form a first integer;
    using the first integer to identify an object, wherein the identified object is used in a synchronizing operation between the first network device and a second network device, and wherein the steps above are performed by a processor, wherein the method is performed in a high system availability mode (HSA), the HSA mode comprising an active side and a standby side; and
    hashing the generated string to form a second integer, the second integer representing a HSA object identifier, the HSA object identifier is identical for the active side and the standby side.

2. The method of claim 1, wherein the object comprises a database entry.

3. The method of claim 1, wherein the object comprises a verification value.

4. The method of claim 3, wherein the verification value is used to verify a software build.

5. The method of claim 1, wherein the object is used to communicate the data between the network devices.

6. The method of claim 1, wherein the object comprises an object identifier in a quality of service (QoS) operation.

7. The method of claim 6, wherein the QoS is a modular quality of service (QoSMQC).

8. The method of claim 7 further comprising:
    indexing a configuration of the QoSMQC in a Management Information using the object identifier; and
    correlating the configuration of the QoSMQC and the Management Information Base object identifiers, the Management Information Base object identifiers are formed after hashing.

9. The method of claim 8, wherein the management information is a class based quality of service management information base (CBQoSMIB), the CBQoSMIB describing the configuration of the QoSMQC in the network devices.

10. The method of claim 7 further comprising generating the string on the basis of at least one of: the QoSMQC, a class of the QoSMQC configuration, a network interface, and a policy-map, wherein the policy-map is a list of instructions attached to a network interface.

11. The method of claim 10 further comprising hashing the generated string at runtime to form a second integer, the second integer representing a runtime object identifier.

12. The method of claim 1, wherein the method is performed in a high system availability mode (HSA), the HSA mode comprising an active side and a standby side.

13. The method of claim 12 further comprising hashing the generated string to form a second integer, the second integer representing a HSA object identifier, the HSA object identifier is identical for the active side and the standby side.

14. The method of claim 1 further comprising:
    a collision handling mechanism, wherein the collision handling mechanism comprises:
    a global counter file, the global counter file generating object identifiers for synchronizing the active side and the standby side.

15. The method of claim 1, wherein the method is performed in a non-high system availability mode (NHSA).

16. The method of claim 1, wherein the method is performed in an interface management information base (IF-MIB), the IF-MIB is a management information base for network interfaces.

17. The method of claim 1, wherein the method is performed in network storage systems, the network storage systems sharing data utilizing a unique index value, the unique index value is formed by hashing an original data in the network storage systems.

18. The method of claim 1 further comprising tracing the data on the basis of the first integer.

19. A system comprising:
    a plurality of network devices comprising:
    means for generating a string based on configuration of a modular quality of service (QoSMQC);
    means for hashing the generated string to form a first integer, the first integer representing an object identifier in the QoSMQC;
    means for indexing the configuration of the QoSMQC in a class based quality of service management information base (CBQoSMIB) using the object identifier; and
    means for correlating the configuration of the QoSMQC and the CBQoSMIB object identifiers, the CBQoSMIB object identifiers are formed after hashing.

20. The system of claim 19, wherein the network comprises one of a plurality of network devices, including routers, access servers, switches, bridges, hubs, computer hosts, storage devices, and printers.

21. The system of claim 19, wherein the system utilizes a simple network management protocol (SNMP), the SNMP providing exchange of management information among the plurality of network devices.

22. A non-transitory computer-readable medium containing computer executable instructions to perform a method, the method comprising:
    one or more instructions for generating a string based on configuration information in a first network device;
    one or more instructions for hashing the generated string to form a first integer;
    one or more instructions for using the first integer to identify an object, wherein the identified object is used in synchronizing operation between the first network device and a second network device;
one or more instructions for indexing the configuration of the QoS in a management information object identifier; and
one or more instructions for correlating the configuration of the QoS and the Management Information object identifiers, the management information object identifiers are formed after hashing.

23. A system comprising:
a plurality of network devices comprising;
means for generating a string based on configuration of a modular quality of service (QoSMQC);
means for hashing the generated string to form a first integer, the first integer representing an object identifier in the QoSMQC;
means for indexing the configuration of the QoSMQC in a class based quality of service management information base (CBQoSMIB) using the object identifier; and
means for correlating the configuration of the QoSMQC and the CBQoSMIB object identifiers, the CBQoSMIB object identifiers are formed after hashing.

24. An apparatus comprising:
means for generating a string based on configuration of a modular quality of service (QoSMQC);
means for hashing the generated string to form a first integer, the first integer representing an object identifier in the QoSMQC;
means for indexing the configuration of the QoSMQC in a class based quality of service management information base (CBQoSMIB) using the object identifier; and
means for correlating the configuration of the QoSMQC and the CBQoSMIB object identifiers, the CBQoSMIB object identifiers are formed after hashing.

* * * * *